(12) United States Patent
Yoshida

(10) Patent No.: US 7,945,766 B2
(45) Date of Patent: May 17, 2011

(54) CONDITIONAL EXECUTION OF FLOATING POINT STORE INSTRUCTION BY SIMULTANEOUSLY READING CONDITION CODE AND STORE DATA FROM MULTI-PORT REGISTER FILE

(75) Inventor: Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 129 days.

(21) Appl. No.: 12/323,044

(22) Filed: Nov. 25, 2008

(65) Prior Publication Data

US 2009/0240927 A1 Sep. 24, 2009

(30) Foreign Application Priority Data

Mar. 21, 2008 (JP) ................................. 2008-073433

(51) Int. Cl.
*G06F 9/312* (2006.01)
(52) U.S. Cl. ........................ 712/222; 712/225
(58) Field of Classification Search .................. None
See application file for complete search history.

(56) References Cited

U.S. PATENT DOCUMENTS

| | | | |
|---|---|---|---|
| 5,070,451 A | 12/1991 | Moore et al. | |
| 5,319,757 A | 6/1994 | Moore et al. | |
| 5,889,984 A | 3/1999 | Mills | |
| 6,049,860 A * | 4/2000 | Krygowski et al. | 712/25 |
| 6,112,019 A | 8/2000 | Chamdani et al. | |
| 6,393,555 B1 | 5/2002 | Meier et al. | |
| 6,425,074 B1 | 7/2002 | Meier et al. | |
| 6,714,197 B1 * | 3/2004 | Thekkath et al. | 345/427 |

FOREIGN PATENT DOCUMENTS

| | | |
|---|---|---|
| JP | 7-31603 | 4/1995 |
| JP | 7-210398 | 8/1995 |
| JP | 8-106416 | 4/1996 |
| JP | 11-73314 | 3/1999 |
| JP | 11-184750 | 7/1999 |
| JP | 11-316680 | 11/1999 |
| JP | 2000-105699 | 4/2000 |
| JP | 2003-519835 | 6/2003 |
| JP | 3570188 | 9/2004 |
| JP | 2005-516432 | 6/2005 |
| JP | 3657949 | 6/2005 |
| JP | 3787142 | 6/2006 |

OTHER PUBLICATIONS

European Search Report issued on Jan. 22, 2009 in corresponding European Patent Application 08168555.4.
Gupta, "A Fine-Grained Mimd Architecture based upon Register Channels", Microprogramming and Microarchitecture. Micro 23. Proceedings of the 23RD Annual Workshop and Symposium, Workshop on Orlando, FL, Nov. 27-29, 1990, Los Alamitos, CA, USA, IEEE Comput. SOC, XP010022259, Nov. 27, 1990, pp. 28-37.

* cited by examiner

*Primary Examiner* — Kenneth S Kim
(74) *Attorney, Agent, or Firm* — Fujitsu Patent Center

(57) ABSTRACT

A processor capable of executing conditional store instructions without being limited by the number of condition codes is provided. Condition data is stored in floating-point registers, and an operation unit executes a conditional floating-point store instruction of determining whether to store, in cache, store data.

11 Claims, 24 Drawing Sheets

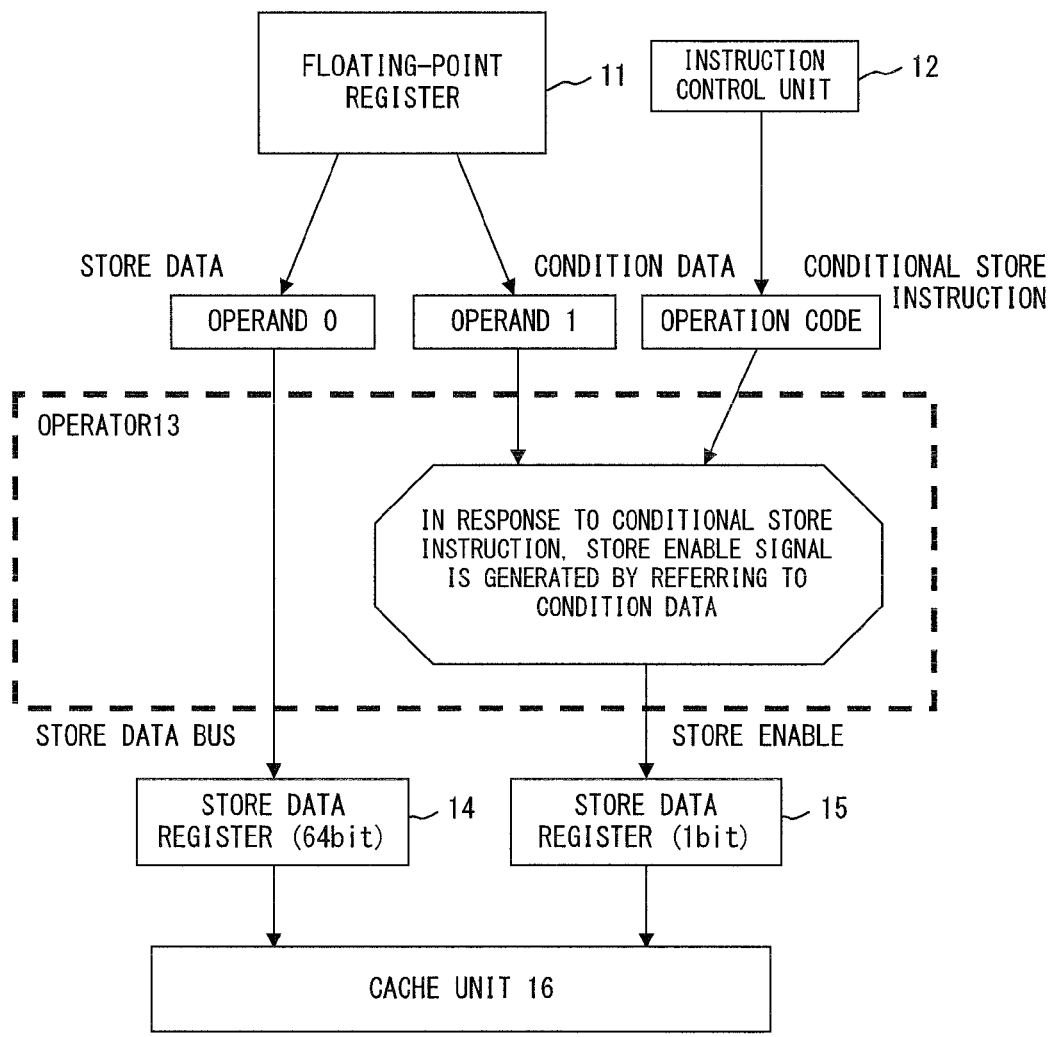
F I G. 1 1

FORMAT OF CONDITIONAL FLOATING-POINT STORE INSTRUCTION;
☆ WHEN IMMEDIATE DESIGNATION BIT (I[0]) IS 1;
 MEMORY ADDRESS IS DESIGNATED BY RS1 DATA + SIGNED EXTENSION IMM
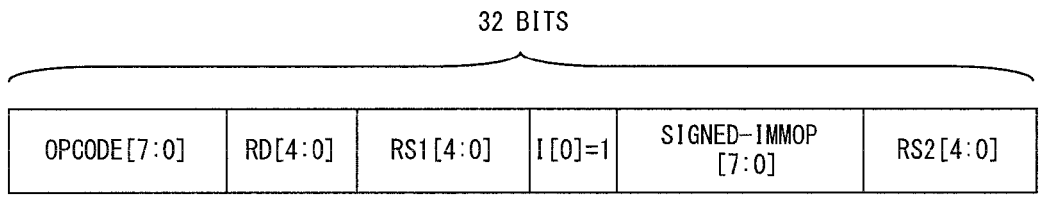
MEMORY ADDRESS = RS1 DATA + SIGNED EXTENSION (IMMEDIATE 8 BITS << 2)
STORE DATA (FLOATING POINT)     = RD DATA
CONDITION DATA (FLOATING POINT) = MOST SIGNIFICANT BIT IN RS2 DATA
F I G.  1 4

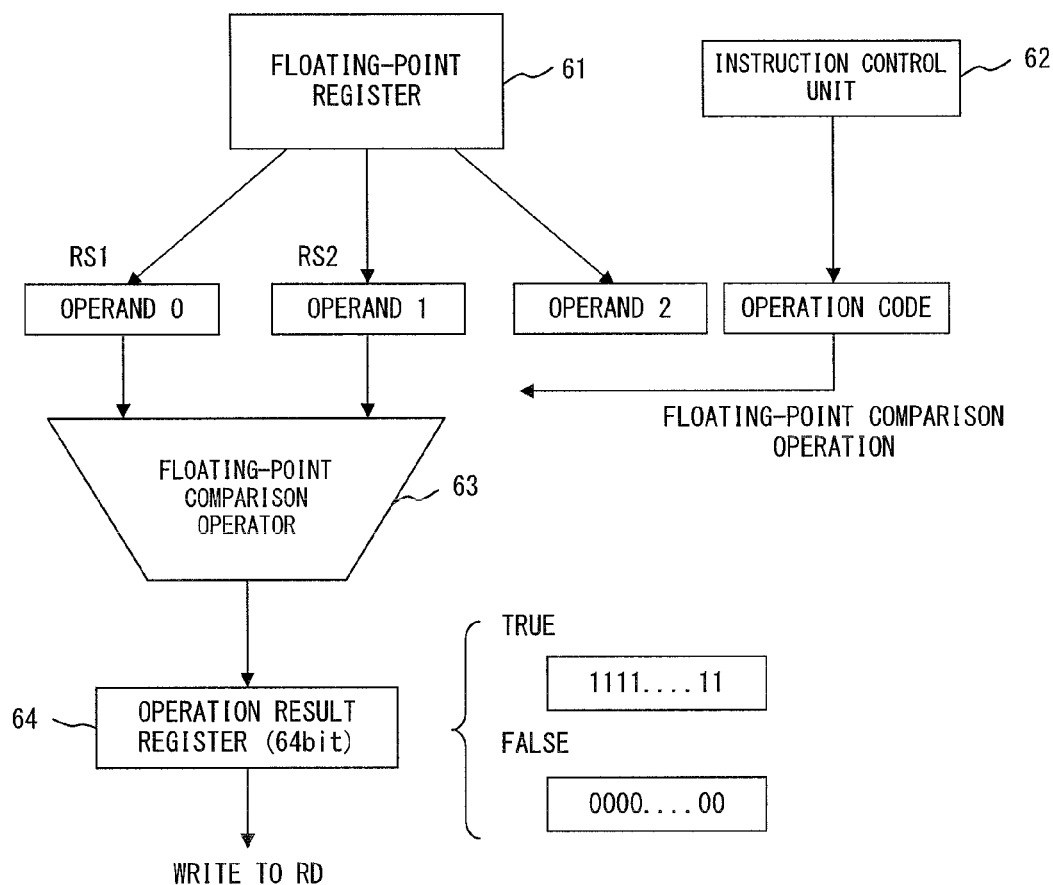
F I G. 16

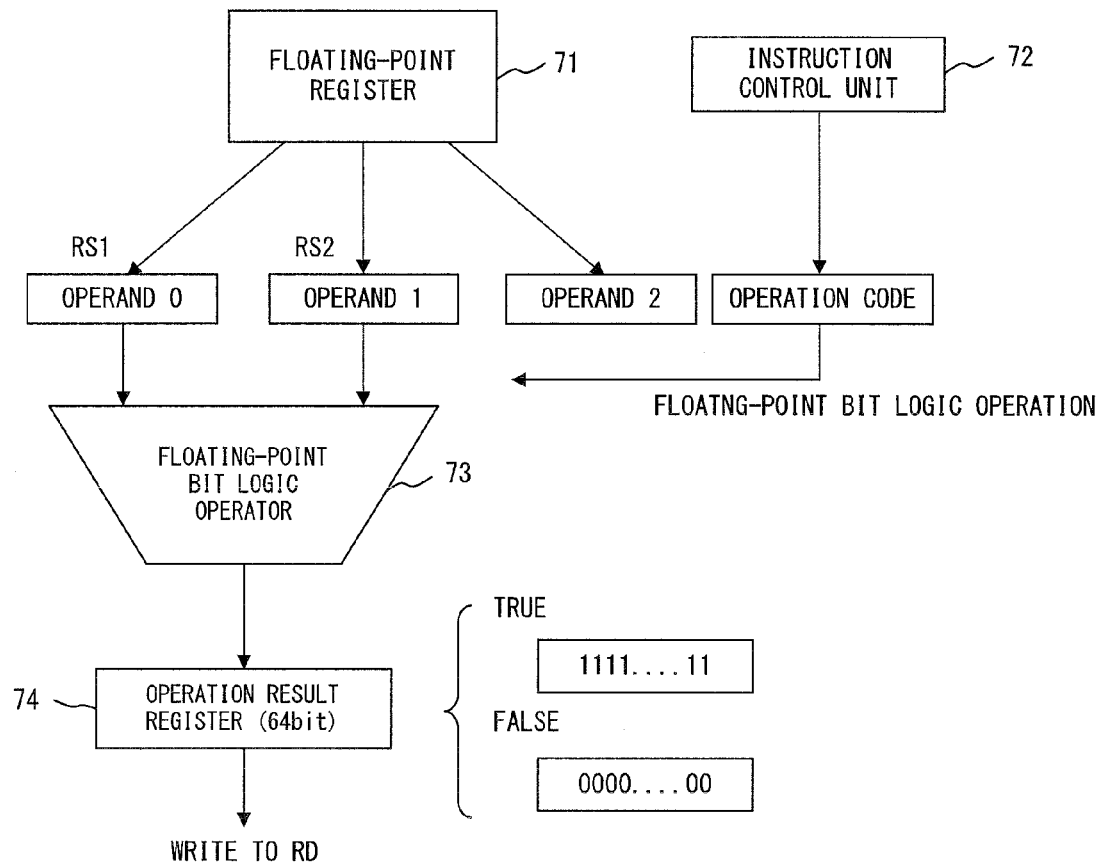
F I G. 17

STORE INSTRUCTION FORMAT (SPARC-V9)

☆ WHEN IMMEDIATE DESIGNATION BIT (I[0]) IS 0:
  MEMORY ADDRESS IS DESIGNATED BY FIXED-POINT REGISTER RS1 +R2

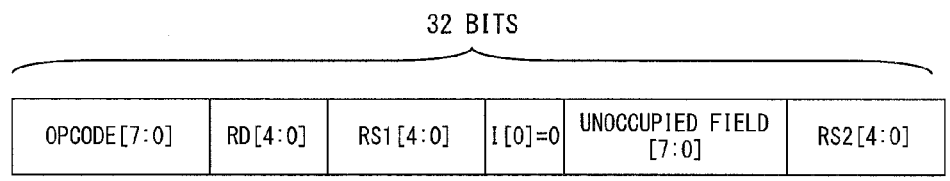

MEMORY ADDRESS = RS1 DATA + RS2 DATA

STORE DATA (FLOATING POINT) = RD DATA

☆ WHEN IMMEDIATE DESIGNATION BIT (I[0]) IS 1:
  MEMORY ADDRESS IS DESIGNATED BY FIXED-POINT REGISTER RS1 +
  SIGNED-EXTENSION-IMMEDIATE VALUE

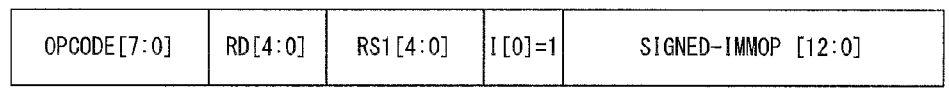

MEMORY ADDRESS = RS1 DATA + SIGNED EXTENSION (IMMEDIATE 13 BITS)

STORE DATA (FLOATING POINT) = RD DATA

FIG. 18

SINGLE-PRECISION FLOATING-POINT DATA

| SIGN | EXPONENT | MANTISSA |
|------|----------|----------|

31 30     23 22     0

DOUBLE-PRECISION FLOATING-POINT DATA

| SIGN | EXPONENT | MANTISSA |
|------|----------|----------|

63 62     52 51     0

F I G. 2 3

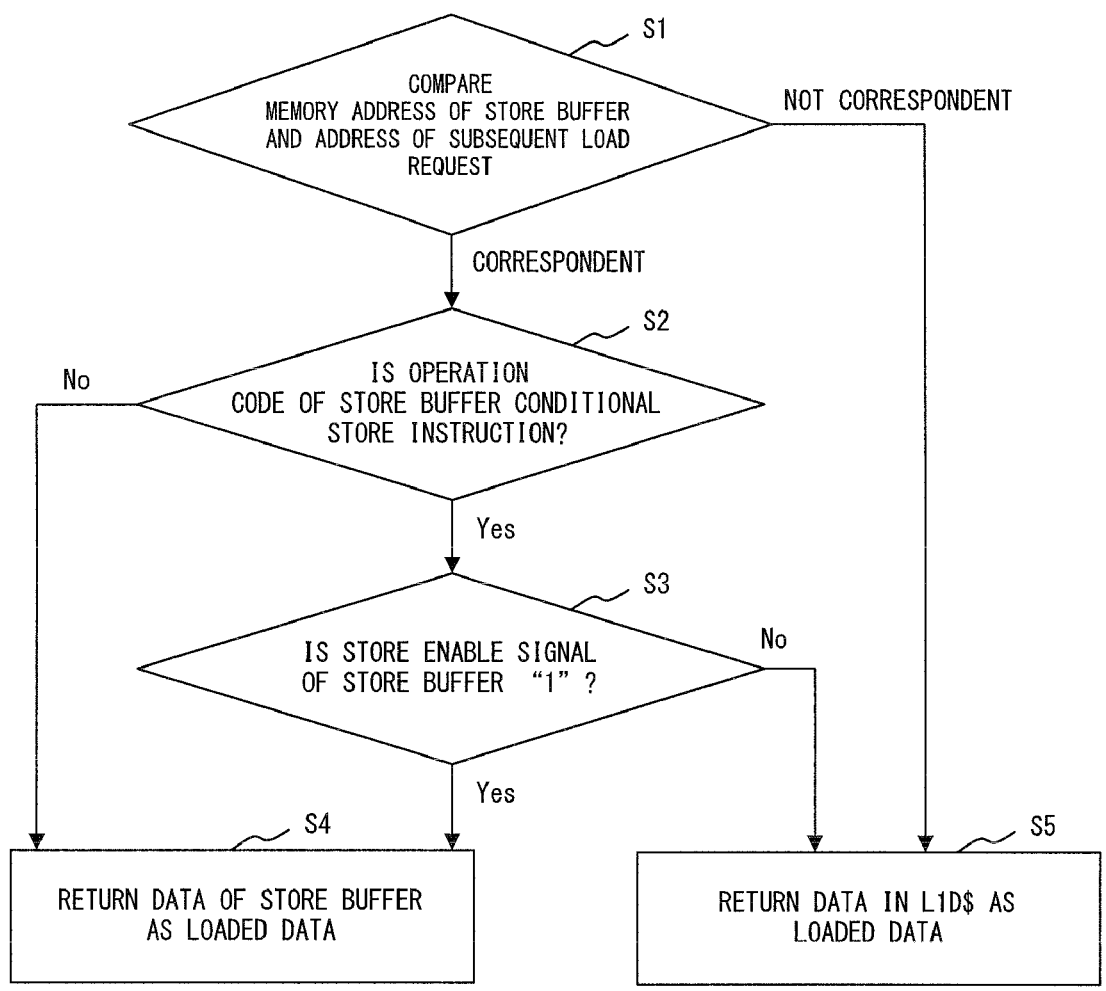
F I G. 2 4

CONDITIONAL EXECUTION OF FLOATING POINT STORE INSTRUCTION BY SIMULTANEOUSLY READING CONDITION CODE AND STORE DATA FROM MULTI-PORT REGISTER FILE

BACKGROUND

1. Field

An aspect of the present invention relates to a processor and an information processing apparatus.

2. Description of the Related Art

A method named software pipelining is sometimes used so that compilers can improve the performance of processing programs in processors. FIG. 1 shows a concept of the software pipelining. When, for example, process A having a dependence relationship in a program source is described and hardware executes the process exactly as described in the program, process A is executed sequentially, which may reduce the performance. In this case, the compiler optimizes the order of the instruction lines upon compiling the program source so that process B, which has no dependence relationship with process A and is to be executed after process A, is inserted between the instruction lines of process A. Thereby, the hardware can execute processes A and B in parallel. This optimization is called software pipelining.

There are roughly two ways of whether to execute an instruction in accordance with a condition in the case when a program includes a conditional statement such as an "if" statement. One is a conditional branch instruction based on whether a condition is true or false, and it is switched as shown in FIG. 2 on the basis of whether or not an instruction line is to be executed. However, as shown in FIG. 2, an instruction line for which it is determined whether or not it will be executed in accordance with a condition cannot be a target of the software pipelining.

The other way to execute an instruction in accordance with a condition is a conditional register move instruction of moving data between registers in accordance with whether a condition is true or false, or a technique of using a conditional store instruction by which information is read from a register and is written to memory. These can be tools of software pipelining. These instructions determine whether or not to update a result in accordance with whether a condition is true or false. In other words, instruction lines do not change regardless of conditions, and accordingly these instructions make it possible to use software pipelining even on a portion including a conditional statement (FIGS. 3 and 4).

Some instruction sets only include definitions of conditional register move instructions, and do not include a conditional store instruction. When a single program is to be executed in a single core or a single thread in a processor using these types of instruction sets, processing is performed as below instead of using conditional store instructions. First, memory data is loaded onto a register. Thereafter, it is determined by using a conditional register move instruction whether or not memory is to be updated, and the information in that register is stored in memory by using a store instruction. If it is determined that the memory in the program should not be updated, the data that has been loaded onto the register is again written to the memory. FIG. 5 shows a flowchart for using a conditional move instruction in place of a conditional store instruction.

There is a method of increasing the speed of parallel processing by using a plurality of cores in one program (thread parallelism). When this method is executed, data in memory is sometimes shared. When a plurality of cores is used for thread parallelism, a conditional store instruction cannot be replaced with a conditional register move instruction.

The reason for this will be explained by referring to FIG. 6.

It is assumed in FIG. 6 that core 0 implements the case when a condition is false and core 1 implements the case when a condition is true, and one of the cores updates memory. If the respective cores load data from a register to the memory and core 1 first stores new data in the memory, and thereafter core 0 again stores the same data in the memory, then the data becomes old data in the memory. This causes an error in processing.

The problem shown in FIG. 6 is caused because once a core loads data into a register, that data cannot be shared by another core. In other words, the thread parallelism by which speed is increased while memory data is shared cannot be performed. This problem can be solved by using conditional store instructions.

If a conditional store instruction is used, data is not loaded onto a register, and when a condition is true, core 1 stores new data in accordance with a conditional store instruction, while when a condition is false, core 0 does not store data, and accordingly new data can be reflected in the memory.

Even when an instruction corresponding to a conditional store instruction is defined, there is an instruction set having a register dedicated to masking in addition to a floating-point register. In this case, the above thread parallelism can be performed by using the masked store. However, the dependence relationship of a mask register has to be detected, which increases the hardware size. Not all programs require masks, and therefore the increase in hardware size lowers the cost performance.

In a conditional instruction such as SPARC-V9 (SPARC is a registered trademark), ICC or XCC are used as condition codes for integers, and fcc0, fcc1, fcc2, and fcc3 are used as condition codes for floating points. When, for example, a conditional instruction is to be executed under a condition of floating points, there are only four independent conditions (i.e., fcc0, fcc1, fcc2, and fcc3), and accordingly a conditional process with five or more conditions cannot be performed. This limitation on the number of conditions that can be held also makes it impossible to realize parallelism via a compiler. FIG. 8 shows an example when the maximum number of condition codes is two.

In recent years, SIMD (Single Instruction Multiple Data) expansion processing in which data of a plurality of registers is parallelly processed as a vector element of input data of a single instruction has been used; SIMD has been adopted to improve performance of scalar processors. When SIMD processing of a conditional instruction is defined, a conditional SIMD instruction has to be executed in accordance with a certain condition. Thereby, a condition code or a mask register has to be made to be expanded in such a manner that they newly correspond to the SIMD for each element.

As described above, in a conventional conditional instruction for processors, the number of conditional processes is limited by the number of condition codes, which is problematic.

SUMMARY

It is an aspect of the present invention to provide a processor that is capable of executing store instructions without limitation posed by the number of condition codes in conditional instructions.

Further, in order to respond to the processer, which is an object of one aspect of the present invention, it is required that a SIMD process of a conditional instruction for the SIMD instructions adopted to improve the performance of a scalar processor be defined.

According to one aspect of the present invention, a processor stores condition data in a floating-point register, and an operation unit executes conditional floating-point store instructions of determining whether or not to store in memory the store data according to the condition data. If the floating-point register is in a SIMD configuration, a processor may store condition data in a floating-point register of each element of SIMD, and the operation unit executes a conditional floating-point store instruction of determining whether or not to store data of each element of the SIMD store instruction according to the condition data.

BRIEF DESCRIPTION OF THE DRAWINGS

FIG. 11 shows operations of a processor according to an embodiment of the present invention;

FIG. 14 shows a format of a conditional floating-point store instruction;

FIG. 16 shows a process of a floating-point comparison operation instruction;

FIG. 17 shows a process of a floating-point bit logic operation instruction;

FIG. 18 shows a format of a non-conditional floating-point store instruction;

FIG. 23 shows a format of a floating-point data; and

FIG. 24 is a flowchart showing a bypass process of store data.

DESCRIPTION OF THE PREFERRED EMBODIMENTS

Figure 1:
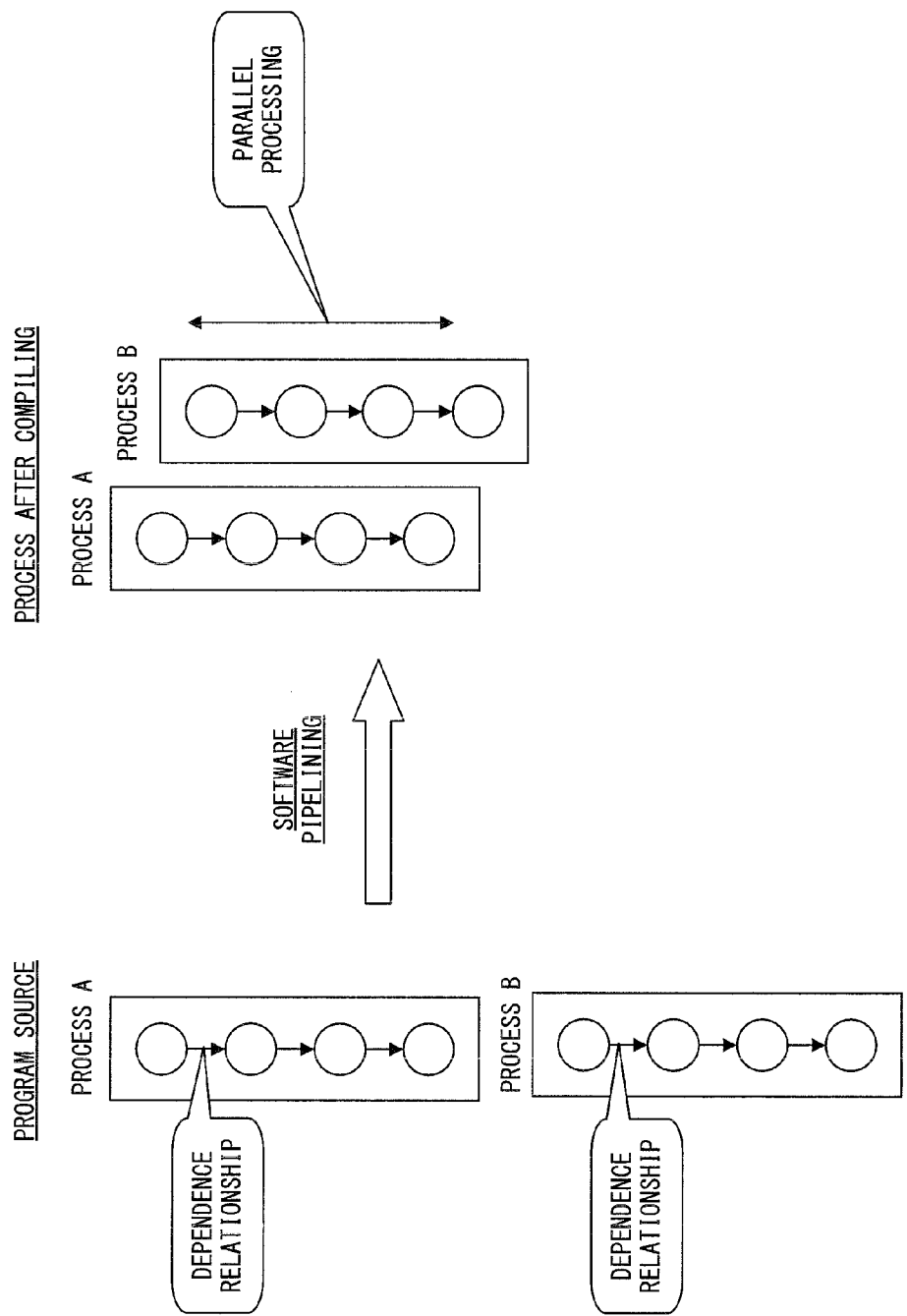
FIG. 1 shows software pipelining.
Figure 2:
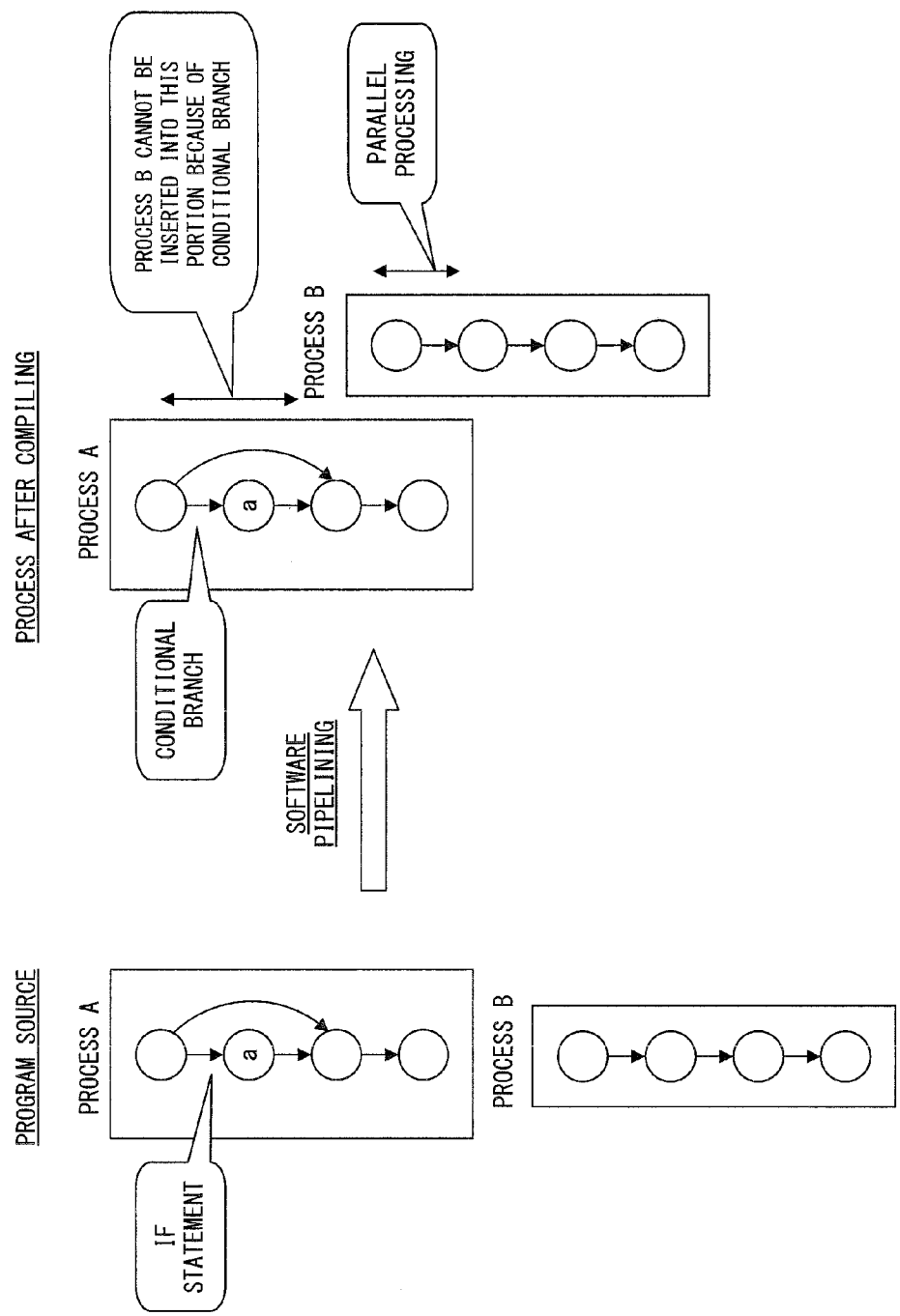
FIG. 2 shows software pipelining when there is a conditional branch instruction.
Figure 3:
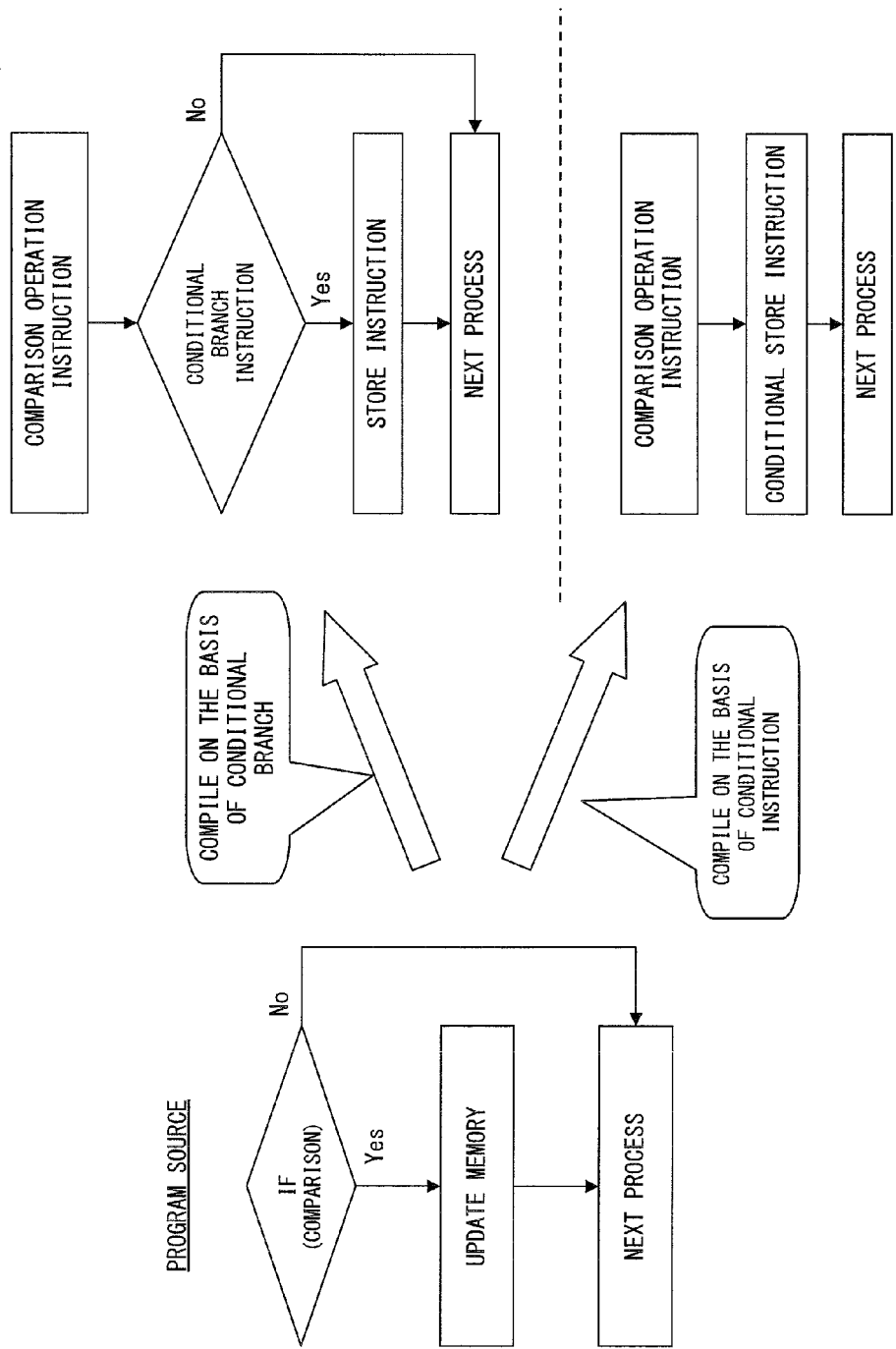
FIG. 3 shows a conditional branch instruction and a conditional instruction.
Figure 4:
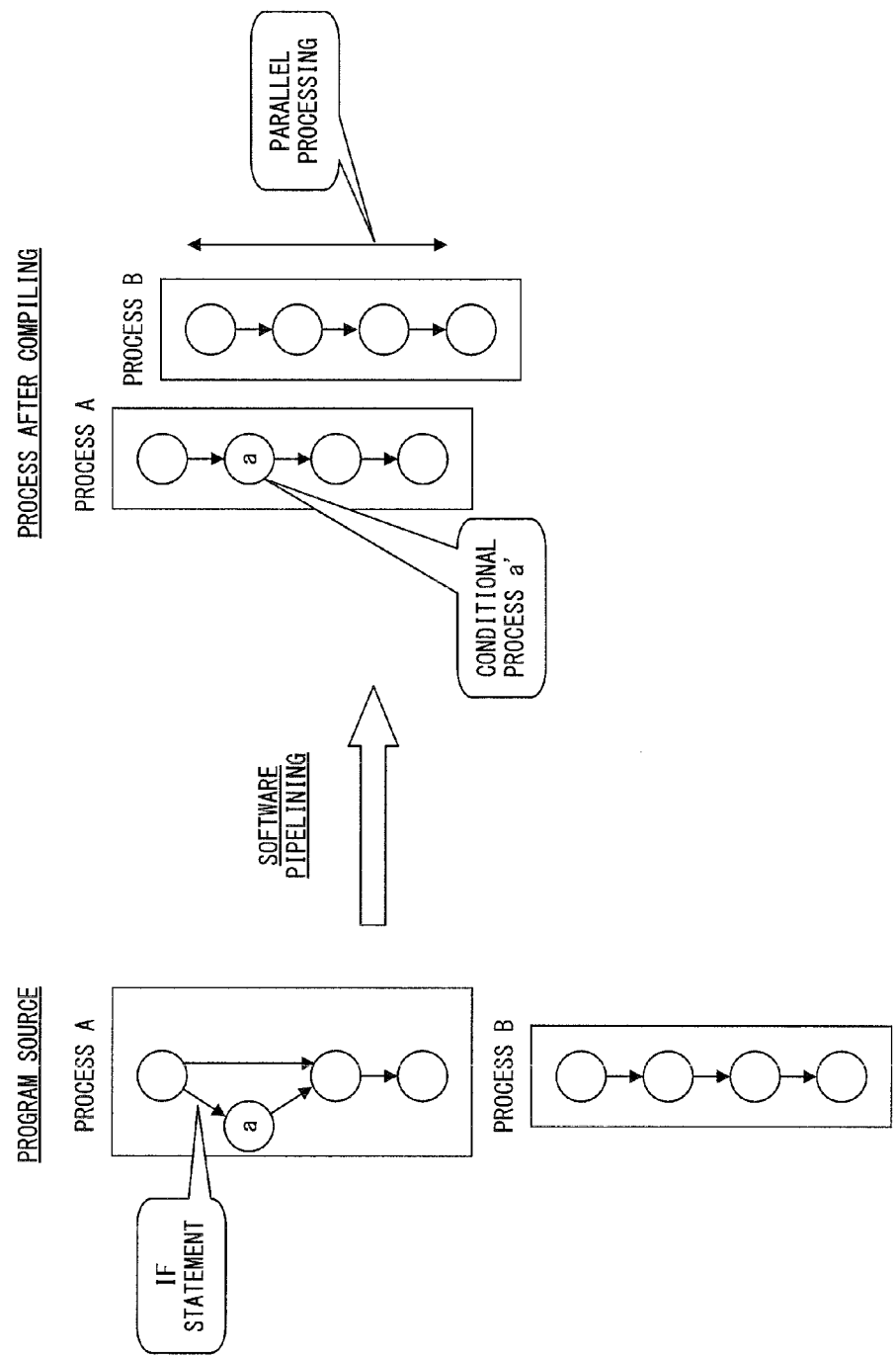
FIG. 4 shows software pipelining when there is a conditional instruction.
Figure 5:
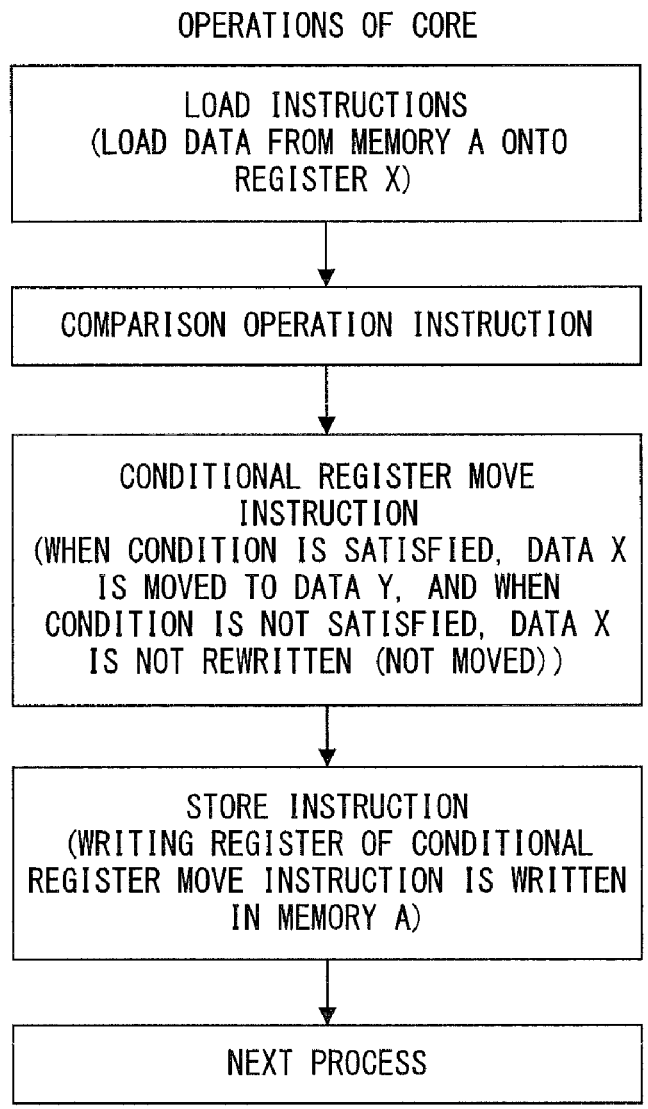
FIG. 5 is a flowchart showing an operation when a conditional move instruction is used in place of a conditional store instruction.
Figure 6:
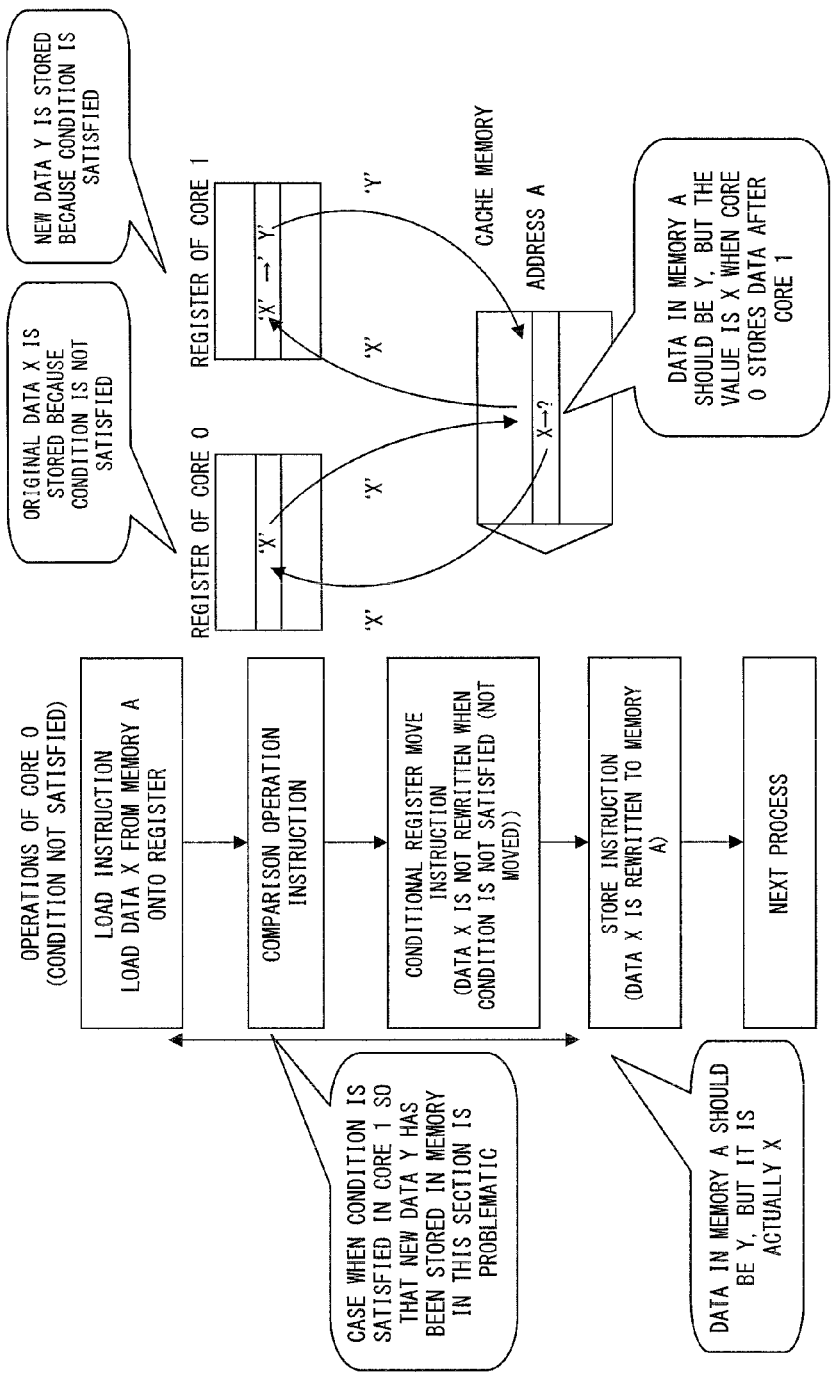
FIG. 6 shows a problem occurring when a conditional move instruction is used in place of a conditional store instruction for performing parallel processing in a multi-core configuration.
Figure 7:
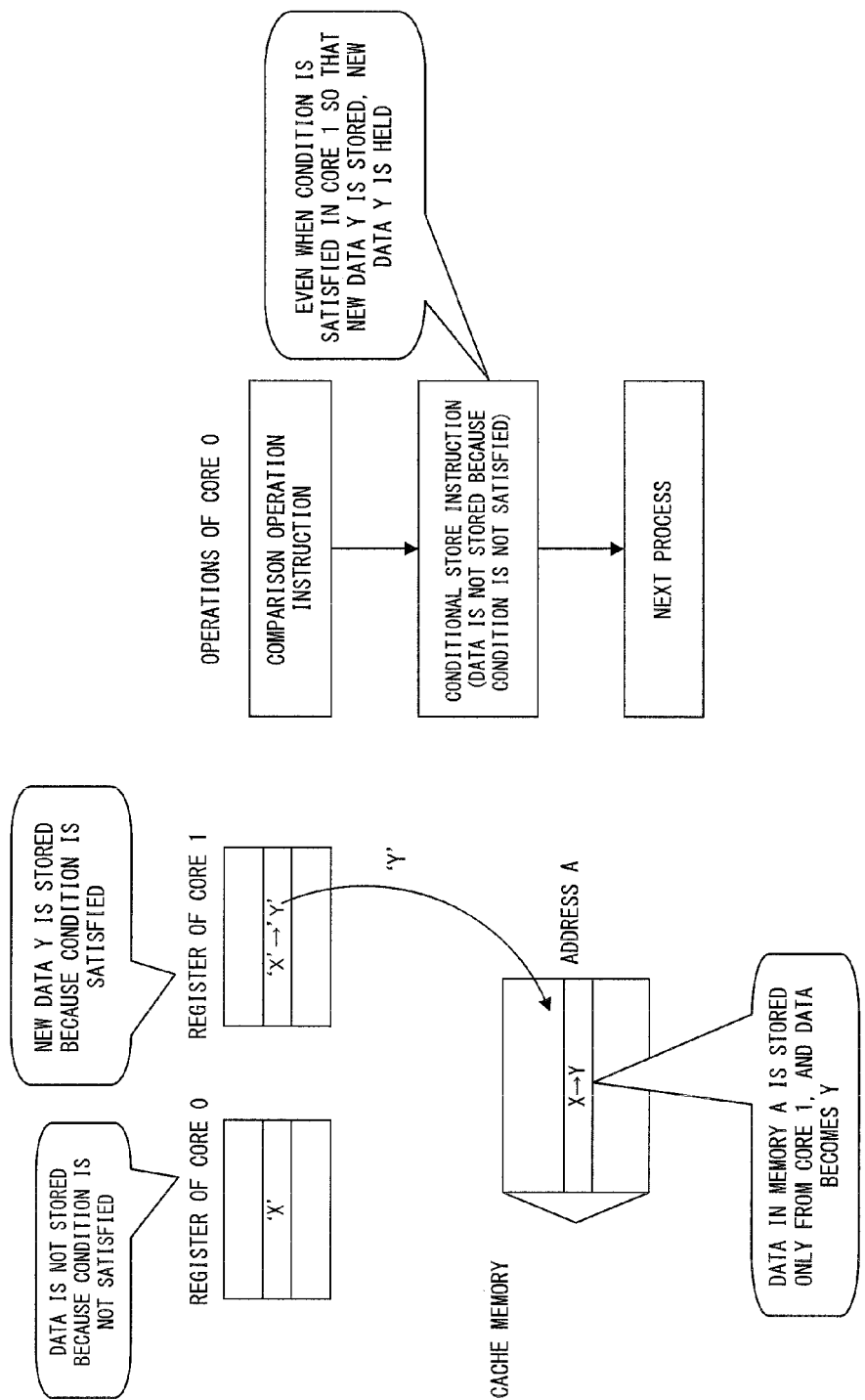
FIG. 7 shows a conditional store instruction.
Figure 8:
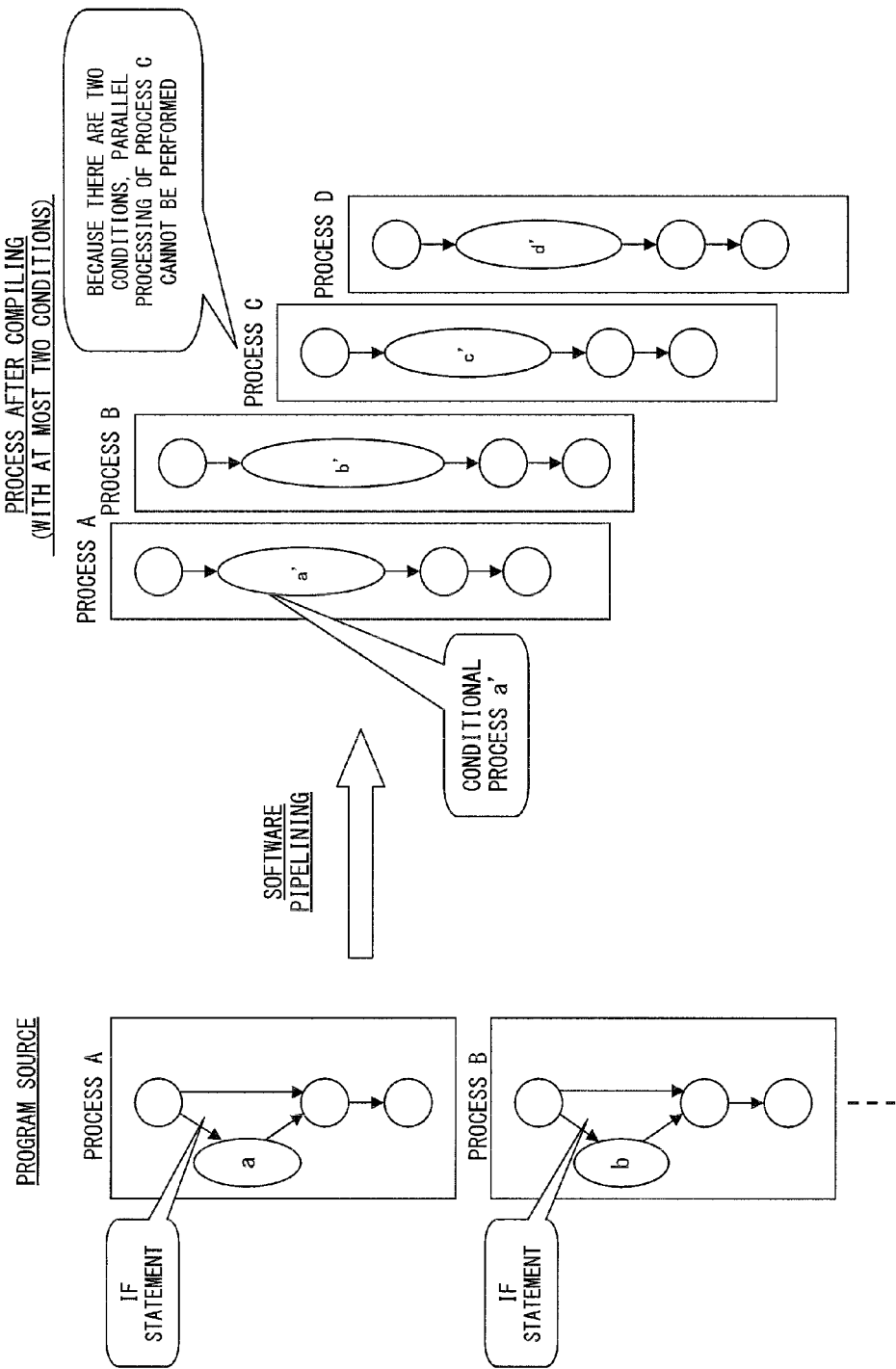
FIG. 8 shows software pipelining in accordance with a conditional instruction when there are at most two pieces of condition data.

Hereinafter, embodiments of the present invention will be explained by referring to the drawings. The scope of the present invention is not limited to the examples given below, and various alterations are allowed without departing from the spirit of the present invention.

First, an outline of an example of the present invention will be explained.

A processer in the present example is provided in an information processing apparatus such as a server or the like. In the information processing apparatus, various input/output devices, memory, a disk device, and the like are connected to the processor via bus.

The processor in the present example stores condition data for executing a conditional store instruction in a floating-point register. The processor defines floating-point comparison operation instruction for generating condition data, and stores the result of the floating-point comparison operation instruction (true or false) in the floating-point register. Also, the processor defines bit logic operation instructions such as AND, OR, XOR, and NOT conducted between the floating-point registers storing the condition data.

The processor in the present example executes a conditional store process in accordance with a value showing true or false as a result of the floating-point comparison operation instruction or a logic operation instruction stored in the floating-point register. An instruction requiring that condition data of a conditional store instruction be stored in a floating-point register, and that the floating-point store be processed in accordance with a value (true or false) of the condition data stored in the floating-point register as described above, is herein referred to as a conditional floating-point store instruction.

An instruction architecture of storing condition data using a dedicated register such as a mask register requires a register file for a mask register in addition to a floating-point register, and also requires a circuit dedicated to the mask register for detecting a dependence relationship. However, in the present embodiment, a value (true/false) that is a result of a floating-point comparison operation instruction and a floating-point logic operation instruction is stored in a floating-point register, and thereby the floating-point register can be utilized so that a detection circuit that detects a dependence relationship of floating-point data can be used. Thereby, any other hardware may not have to be newly provided.

FIG. 11 shows the outline of operations of the processor in the present example when a conditional floating-point store instruction is issued.

Store data is read from a first operand (corresponding to operand 0 in FIG. 11) of a floating-point register 11, and is stored in a store data register 14. Condition data is read from a second operand (corresponding to operand 1 in FIG. 11) of the floating-point register 11. An operation unit 13 refers to an operation code transferred from an instruction control unit 12, and generates a store enable signal in accordance with the condition data if the operation code represents a conditional store instruction. The generated store enable signal is stored in a store enable register 15. A cache unit 16 stores data stored in the store data register 14 in accordance with the value of the store enable register 15.

Figure 9:
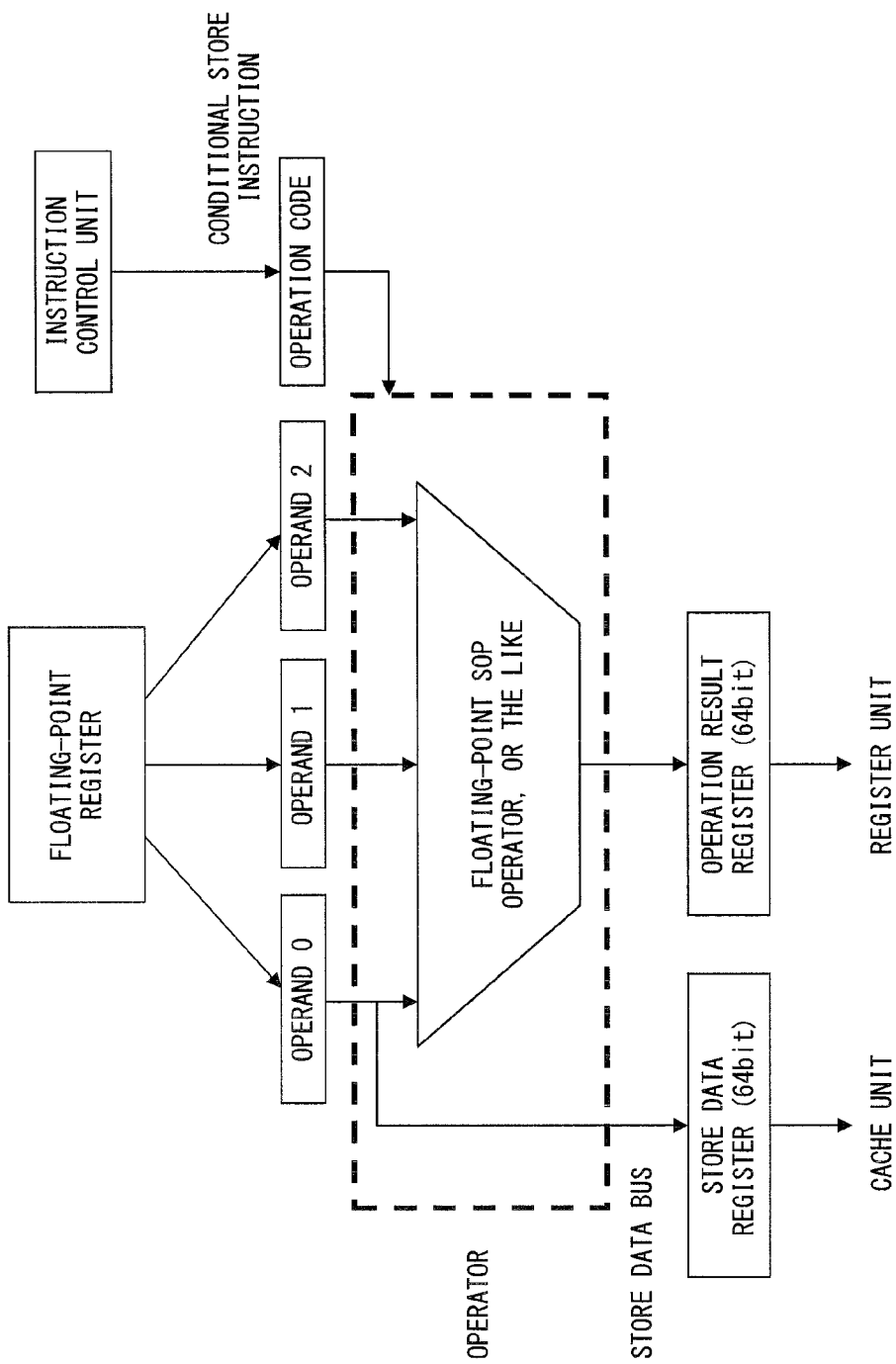
FIG. 9 shows a configuration including a floating-point register and an operator.

In response to a store instruction, a memory address and store data are transferred to cache memory. Reading store data from the floating-point register 11 requires one reading port. A floating-point SOP (sum of product) operation performed as a scientific computation uses three pieces of register data as sources, and accordingly a register file can use three read ports for one operation pipe (see the configurations of the floating-point register and the operation unit in FIG. 9). Accordingly, in the conditional floating-point store instruction in the example, two read ports of this operation pipe are used in order to read condition data simultaneously with the store data. As described above, three existing read ports of the floating-point register 11 can be used, eliminating the need for new hardware.

Figure 12:
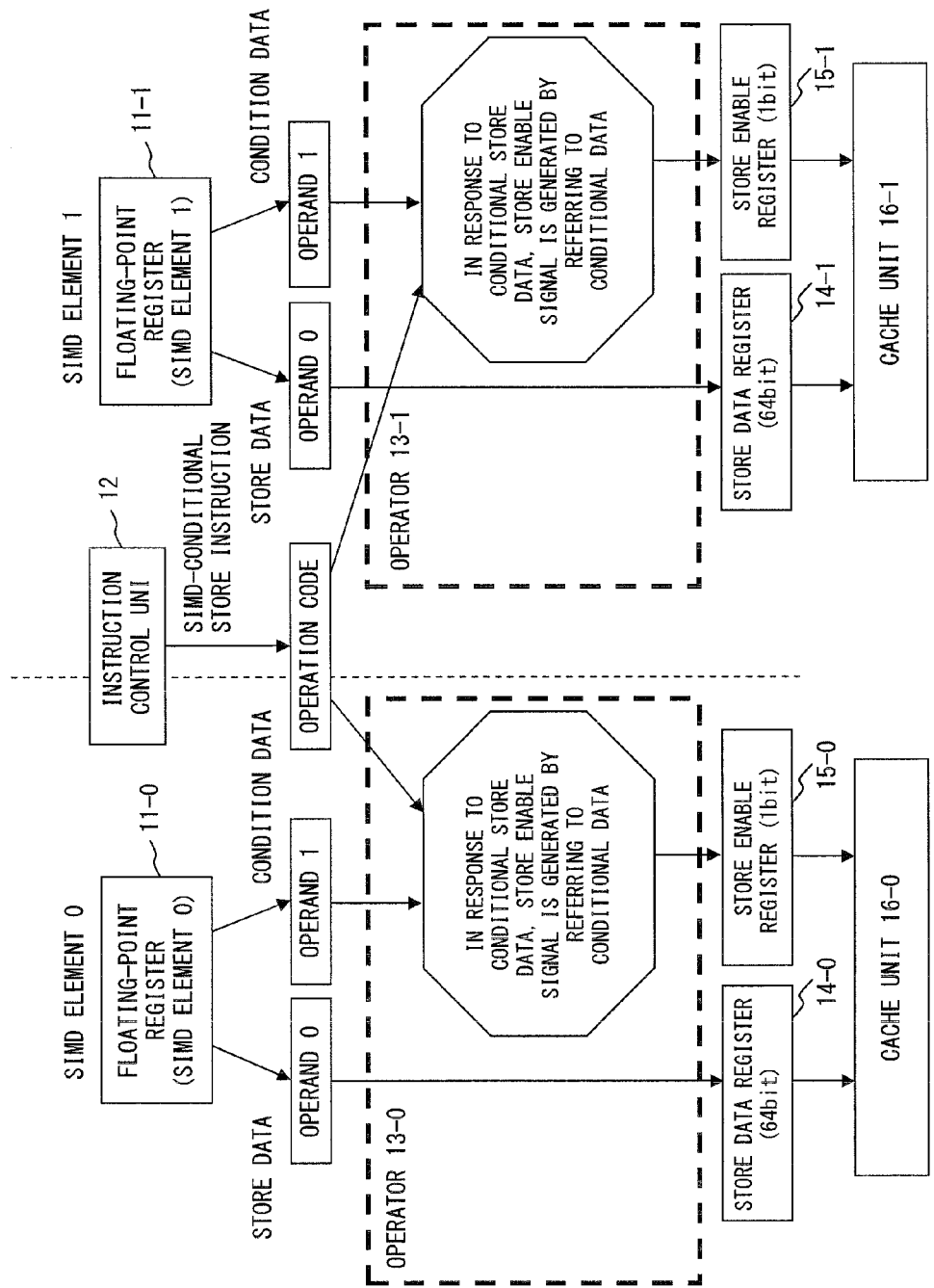
FIG. 12 shows operations of a processor in response to a SIMD-conditional floating-point store instruction.

FIG. 12 shows operations of the processor for processing a conditional floating-point store instruction when the SIMD expansion is required to be performed on the floating-point register 11.

Also in this case, a register for storing a condition, i.e., the floating-point register 11, is subject to the SIMD expansion simultaneously. FIG. 12 shows a case in which there are two elements of SIMD, and the configuration of each element is the same as those in FIG. 11. However, the operation code transferred from the instruction control unit 12 is input into operation units 13-0, 13-1, . . . 13-N of the respective elements in the case of a SIMD-conditional store instruction.

Figure 10:
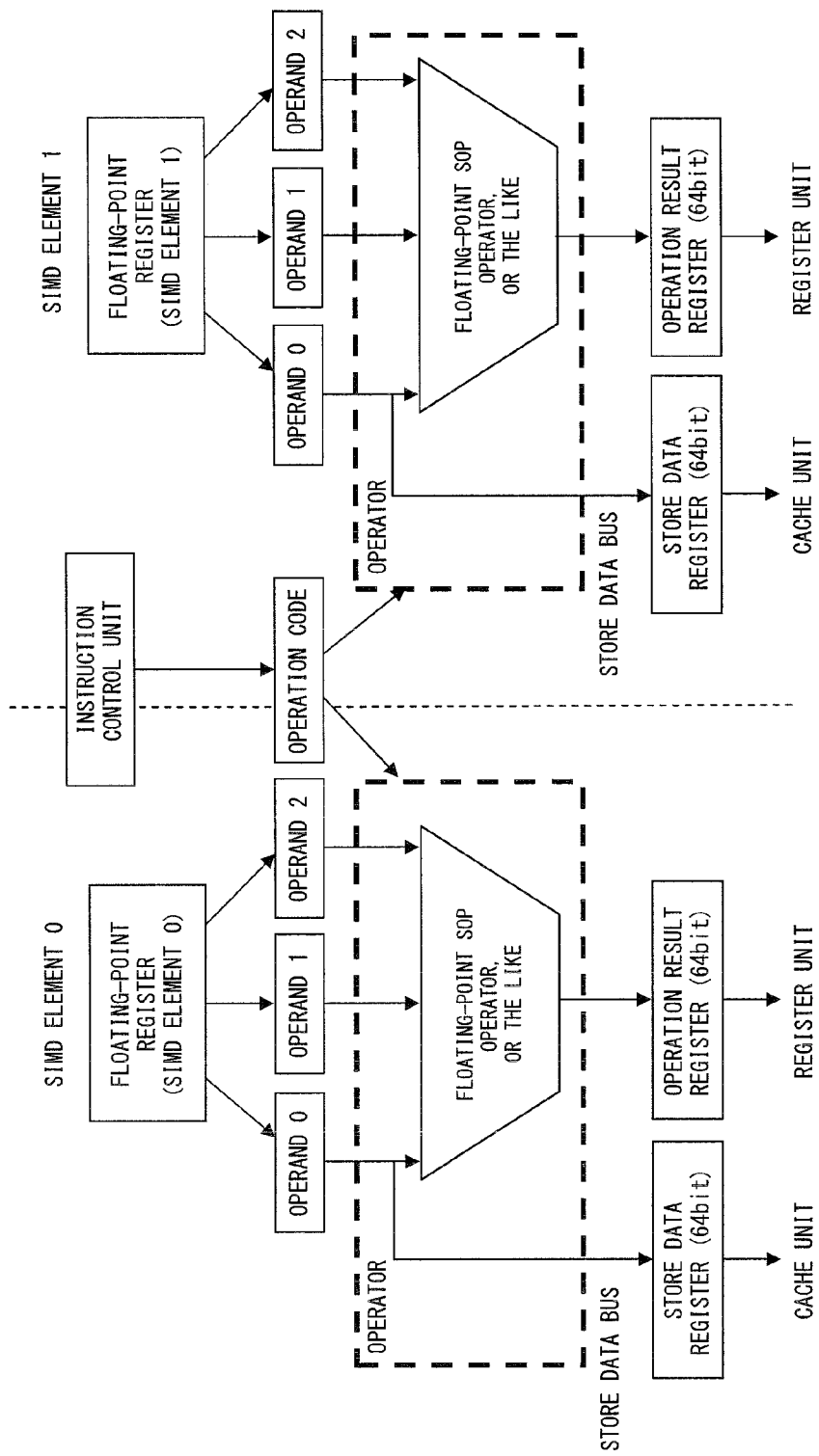
FIG. 10 shows a configuration of a SIMD floating-point register and an operator.

Each element of SIMD has an operation pipe, and each of the operation pipes has three read ports for register files (see the configurations of the floating-point register and the operation units in FIG. 10). Two read pipes of each operation pipe are used to read condition data simultaneously with store data, which is similar to the case shown in FIG. 11.

As shown in FIGS. 11 and 12, a store process is performed in accordance with condition data stored in a floating-point register in the present example. Storing condition data in a floating-point register makes it possible to execute conditional store instructions without being limited by the number of condition codes. In particular, in a processor having an expanded floating-point register region and a great number of floating-point registers, a conditional instruction can be executed with a greater number of conditions.

Next, the present example will be explained in more detail by referring to FIG. 13.

Figure 13:
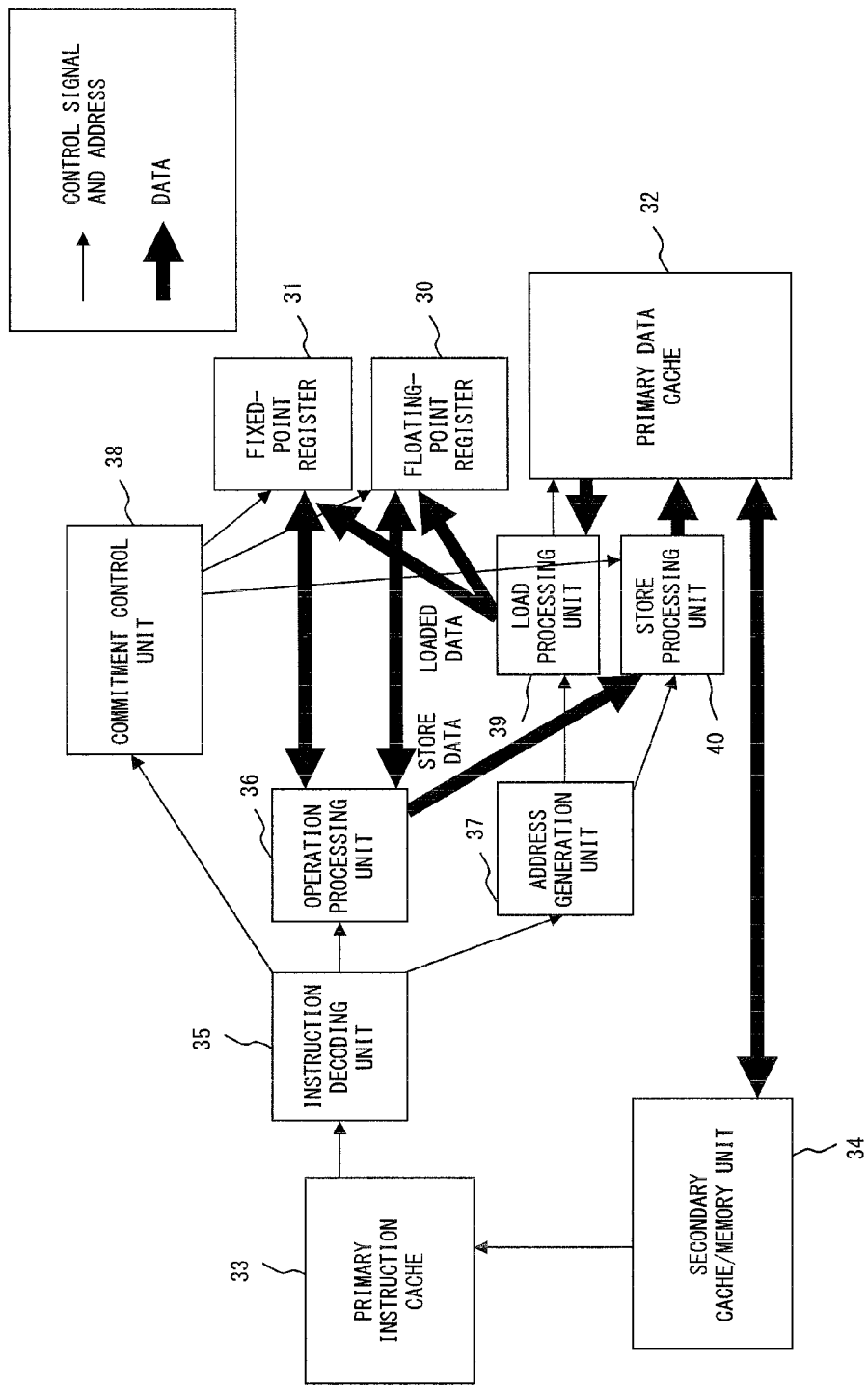
FIG. 13 shows a configuration of a processor according to an embodiment of the present invention.

A processor in FIG. 13 has a primary instruction cache 33, a secondary cache/memory unit 34, a primary data cache 32, an instruction decoding unit 35, an operation processing unit 36, an address generation unit 37, a commitment control unit 38, a load processing unit 39, a store processing unit 40, a fixed-point register 31, and a floating-point register 30.

The instruction decoding unit 35 decodes instructions read from the primary instruction cache 33. The operation processing unit 36 consists of operators and the like for performing operations. The address generation unit 37 generates addresses to be used for accesses from the decoded instructions. The load processing unit 39 processes load instructions. The store processing unit 40 processes store instructions. The commitment control unit 38 controls updating of registers and of memory.

In the present example, a true-conditional floating-point store instruction of storing data when a condition is true, and a false-conditional floating-point store instruction of storing data when a condition is false are defined as conditional floating-point store instructions.

FIG. 14 shows an instruction format of a conditional floating-point store instruction. In the example shown in FIG. 14, the conditional floating-point store instruction consists of an operation code section (OPCODE[7:0]) specifying an instruction type, RS1 (RS1[4:0]) specifying a fixed-point register address for generating a memory address, an immediate designation bit (I[0]), a signed-extension-immediate field (SIGNED-IMMOP[7:0]), an RD field (RD[4:0]) for specifying a floating-point register that stores store data, and an RS2 field ([4:0]) for specifying a floating-point register for storing condition data.

The memory address can be obtained by the following equation when the immediate designation bit (I[0]) is 1.

Memory address=$RS1$ data+signed extension IMM (immediate 8 bits<<2)

The floating-point store data is a value of a floating-point register represented by RD.

The condition data is the most significant bit of the floating-point register represented by RS2, i.e., a sign bit.

As described above, the register of operand 2 (RS2) is assigned to a condition register in accordance with a conditional floating-point store instruction. Accordingly, the method of specifying the memory address used for storing data is based on the sum of operand 1 and an immediate field. A conditional floating-point store instruction can limit store data to four bytes of the single-precision floating-point length and to eight bytes of the double-precision floating-point length. Accordingly, the immediate field of an instruction operand is used with a shift of two bits. Thereby, memory addresses can be specified over a wide area in accordance with the addition of displacement by the base address RS register and the immediate field.

Next, definitions of floating-point comparison operation instructions and floating-point bit logic operation instructions for generating condition data in the present example will be explained by referring to FIGS. 15 through 17.

First, an fcompgt instruction, an fcompge instruction, an fcomplt instruction, an fcomple instruction, an fcompeq instruction and an fcompne instruction are defined as floating-point comparison operation instructions. In response to these floating-point operation instructions, two floating-point register values are compared to each other, and the result of the comparison (true or false) is returned to a floating-point register.

fcompgt instruction returns 1 to the most significant bit of RD when RS1>RS2 fcompge instruction returns 1 to the most significant bit of RD when RS1≧RS2 fcomplt instruction returns 1 to the most significant bit of RD when RS1<RS2 fcomple instruction returns 1 to the most significant bit of RD when RS1≦RS2 fcompeq instruction returns 1 to the most significant bit of RD when RS1=RS2 fcompne instruction returns 1 to the most significant bit of RD when RS1≠RS2

Figure 15:
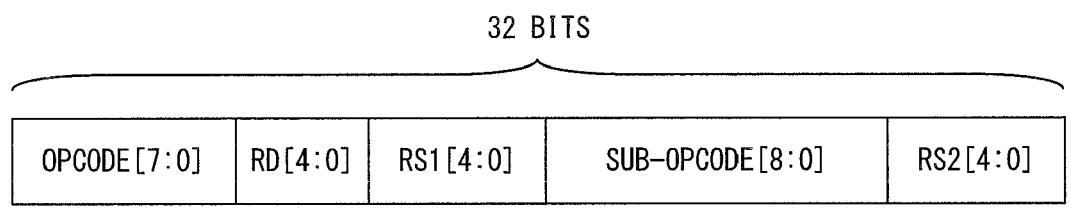
FIG. 15 shows a format of a floating-point comparison operation instruction and a floating-point bit logic operation instruction.

FIG. 15 shows a format of a floating-point comparison operation instruction. The floating-point comparison operation instruction shown in FIG. 15 consists of an operation code section (OPCODE[7:0]), an RS1 field (RS1[4:0]), a signed-extension-immediate field (SIGNED-IMMOP[8:0]), an RD field (RD[4:0]), and an RS2 field ([4:0]), and the instruction types such as an fcompgt instruction and an fcompge instruction are recognized in accordance with operation codes (OPCODE filed and SUB-OPECODE filed). FIG. 16 is a diagram showing a floating-point comparison operation process. A floating-point comparison operator 63 compares operand 0 (RS1) from a floating-point register 61 and operand 1 (RS2), and stores the result in a register 64, and also writes the result to RD. In the present example, when a comparison result of operands is true, 1 is written to all the bits including the most significant bit of RD, and when it is false, 0 is written to all the bits including the most significant bits of RD.

When an "if" statement includes a plurality of conditions such as a plurality of comparisons, operations of AND, OR, NOT, and XOR of the bit of the condition data obtained above have to be performed. Accordingly, logic operations of bit of data of RS1 and RS2 are performed, and a floating-point bit logic operation instruction fand instruction, an for instruction, an fnot instruction, and an fxor instruction are defined for writing the result to RD. The format of the floating-point bit logic operation instruction is as similar as that shown in FIG. 15. FIG. 17 shows a floating-point bit logic operation instruction process. A floating-point bit logic operator 73 compares operand 0 (RS1) and operand 1 (RS2), and stores the result of the comparison in an operation result register 74, and also writes the result to RD. Similarly to a floating-point comparison operation instruction, when the comparison result of operands is true, 1 is written to all the bits including the most significant bits of RD, and when the result is false, 0 is written to all the bits including the most significant bit of RD.

The floating-point operation comparison instruction and floating-point bit logic operation instruction define the double-precision floating-point (eight bytes) and the single-precision floating-point (four bytes) respectively. Operation codes are used for discriminating between the double-precision floating point and the single-precision floating point.

Hereinabove, instruction formats, definitions of floating-point comparison operation instructions, and floating-point logic operation instructions in the present example have been explained. Next, a store process will be explained.

First, a floating-point store instruction that is not conditional will be explained. A floating-point store instruction that is not conditional is herein referred to as a non-conditional floating-point store instruction. A format of a non-conditional floating-point store instruction is shown in FIG. 18.

The instruction format includes an operation code section (OPCEOE[7:0]). Also, the instruction format includes an immediate designation bit (I[0]) for specifying whether or not an immediate operand is used. When I[0]=0, the sum of RS1 and RS2 is used as the memory address for specifying a fixed-point register address. In this case, the store instruction has an unoccupied field of eight bits. When I[0]=1, the sum of RS1 and 13 bits of a signed-extension-immediate field (SIGNED-IMMOP) is used as the memory address. Further, the instruction format includes an RD field for specifying a floating-point register.

Figure 19:
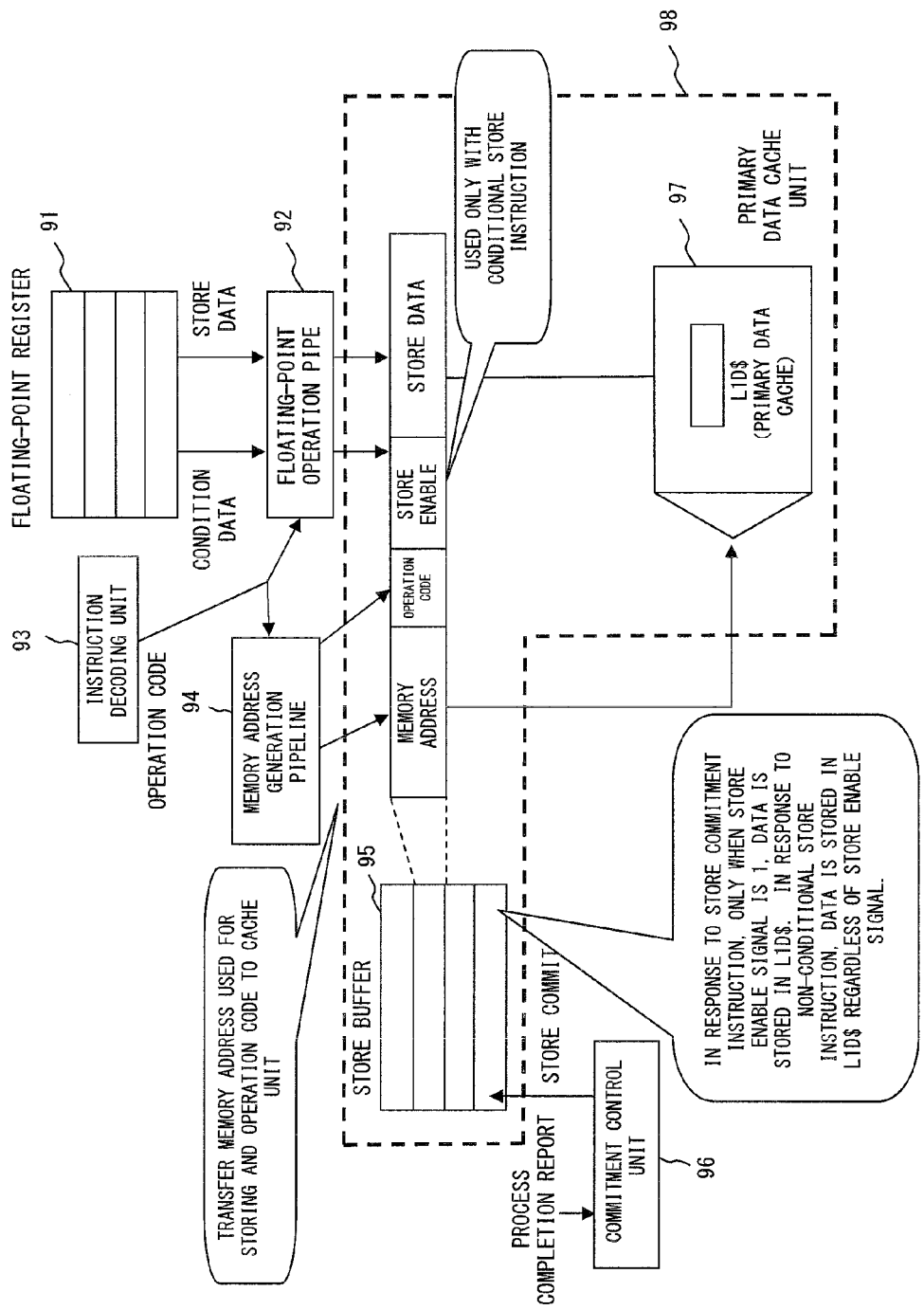
FIG. 19 shows a store process.

FIG. 19 shows processing of a store instruction.

First, an instruction is decoded by an instruction decoding unit 93, and the decoding result is stored in an operation field in a store buffer 95 in a primary data cache 98 via a memory address generation pipeline 94.

In response to a non-conditional floating-point store instruction, the memory address to be stored is transferred to a cache unit 98 that controls store instructions, the transfer being carried out via an address generation pipeline 94 for generating a sum of RS1 and RS2 or a sum of RS1 and thirteen bits of the signed-extension-immediate field. The memory address is stored in a memory address field in the store buffer 95 in the primary data cache 98. The condition data in a floating-point register 91 is stored in a store enable field in the store buffer 95 in the primary data cache 98 via a floating-point operation pipe 92. The floating-point data to be stored is transferred to the cache unit 98 via the floating-point operator pipeline 92.

Figure 20:
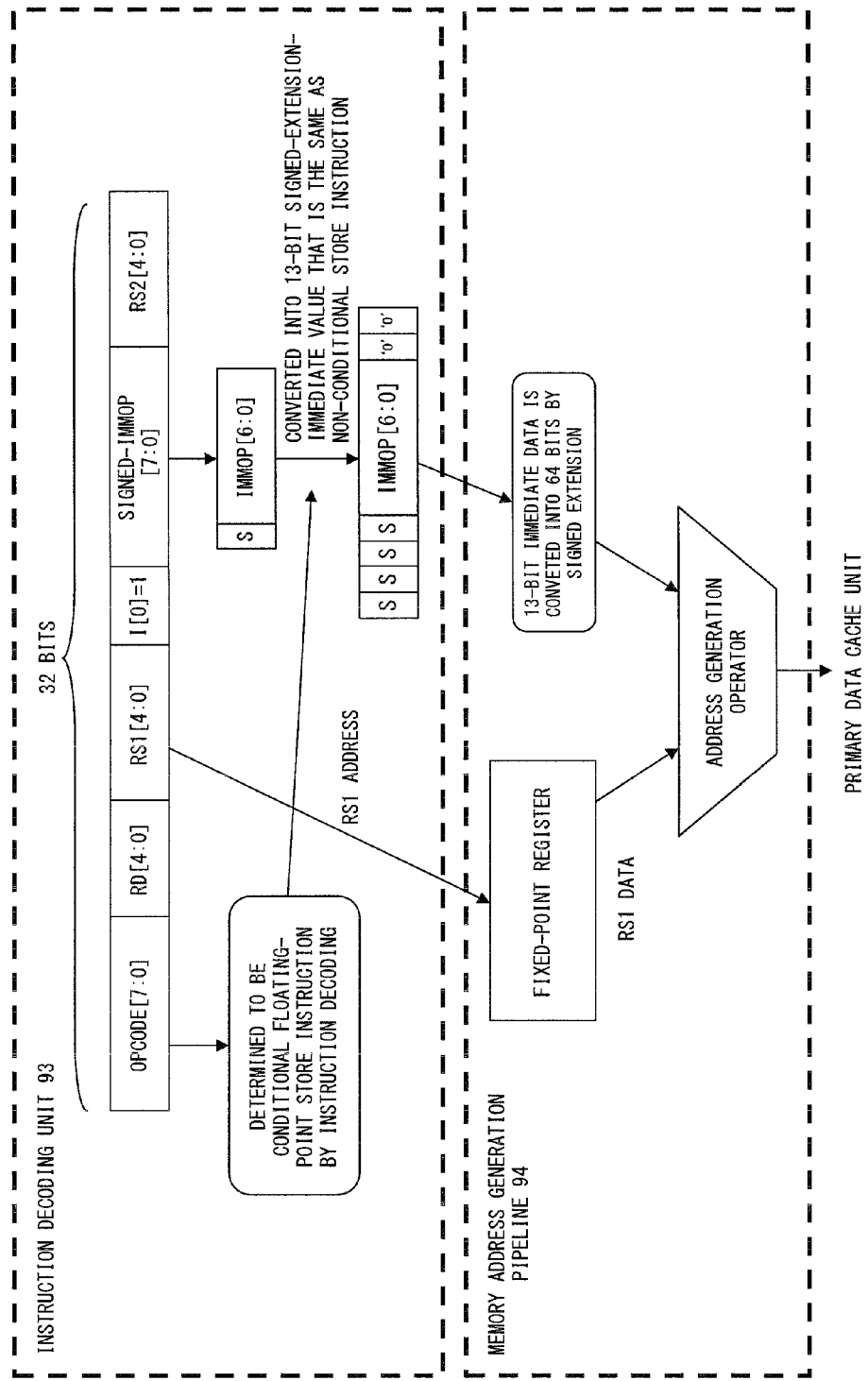
FIG. 20 shows a process of an immediate field of a conditional floating-point store instruction.

In response to a conditional floating-point store instruction, the memory address to be stored is transferred to the primary data cache 98 that controls store instructions, the transfer being carried out via the memory address generation pipeline 94 for generating a sum of RS1 and eight bits of a signed-extension-immediate field. In response to a conditional floating-point store instruction, the data length can be limited to data of four bytes of single-precision floating-point data or eight bytes of double-precision floating-point data because the store data is floating-point data. As shown in FIG. 20, when an instruction is determined to be a floating-point store instruction as a result of instruction decoding, the signed-extension-immediate field of the instruction operation code is shifted to the left by two bits ('SSSS' IMMOP[6:0] '00' in FIG. 20). Thereby, a higher memory address can be specified. The manner of the two-bit shift is that "SIGNED-IMMOP[7:0]"→"'S' IMMOP[6:0]"→"'SSSS'IMMOP[6:0] '00'". The most significant bit "S" of the signed-extension-immediate field is subject to signed expansion when it is added to RS1 as a sign bit.

Figure 21:
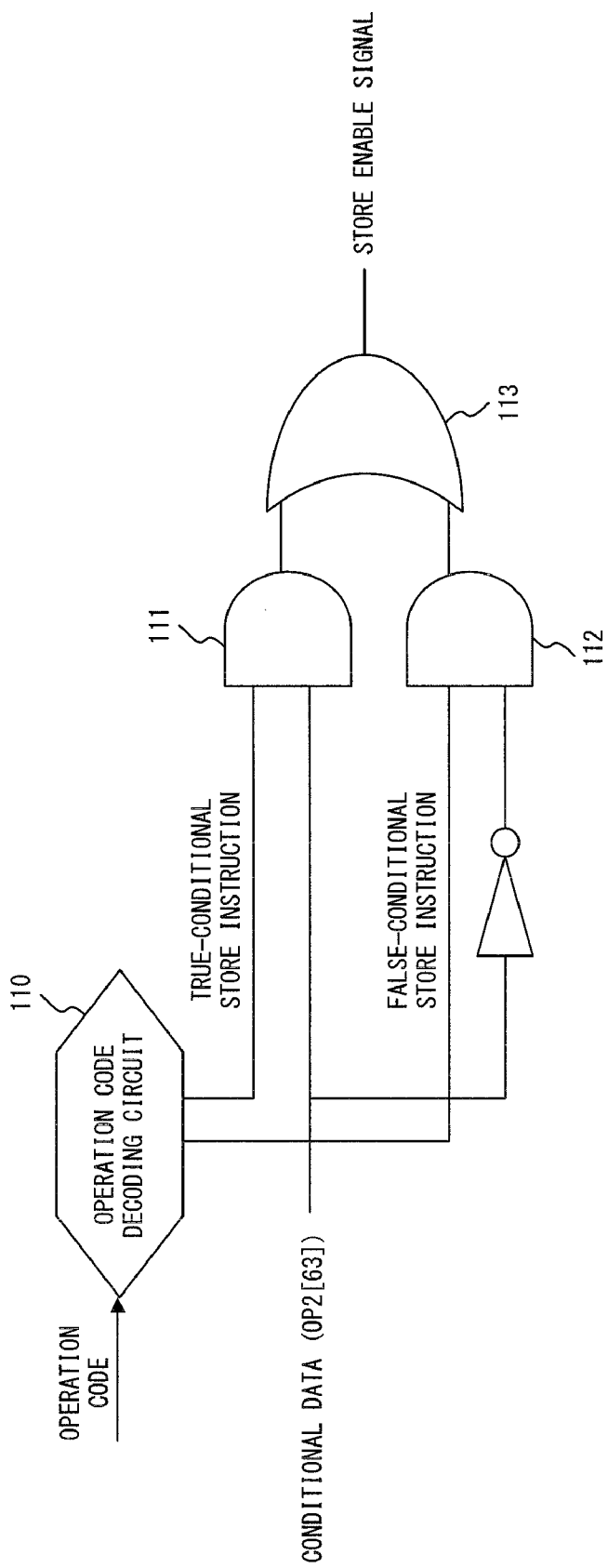
FIG. 21 shows a circuit for generating a store enable signal.

The floating-point data to be stored and the condition data in the floating-point register are transferred to the primary data cache 98 in the following manner. The floating-point operator has reading ports for a three-source operand (see FIG. 9). In response to a non-conditional floating-point store instruction, the reading port for the first operand is used so that store data is read from the floating-point register 91 and transferred to the primary data cash 98 via the operator (floating-point operator pipeline 92). In response to a conditional floating-point store instruction, a floating-point register for storing conditions is read from the second operand. The operator 92 refers to an operation code of an instruction received from the instruction decoding unit 93. If the operation code specifies a true-conditional floating-point store instruction and if the most significant bit of the second operand is "1", the operator 92 transfers store enable signal, which is set as "1", to the primary data cash 98 using the same cycle of the data storing. If the operation code specifies a false-conditional floating-point store instruction and if the most significant bit of the second operand is "0", the operator 92 transfers store enable signal, which is set as "1", to the primary data cash 98 using the same cycle of the data storing. FIG. 21 shows a circuit used for generating a store enable signal for a true-conditional floating-point store instruction or a false-conditional floating-point store instruction. The circuit in FIG. 21 is included in the floating-point operator pipeline 92 shown in FIG. 19.

In FIG. 21, operation codes decoded by an operation code decoding circuit 110 are output.

True-conditional store instruction are output to an AND circuit 111, and false-conditional store instructions are output to another AND circuit 112. Condition data (the most significant bit of the second operand) is input into the AND circuit 111 as it is, and is input into the AND circuit 112 after being inverted. Then the output of the AND circuit 111 or the AND circuit 112 is input into an OR circuit 113 so that a store enable signal is generated. In this manner, store enable signals are generated from operation codes and the most significant bits of the second operands.

Figure 22:
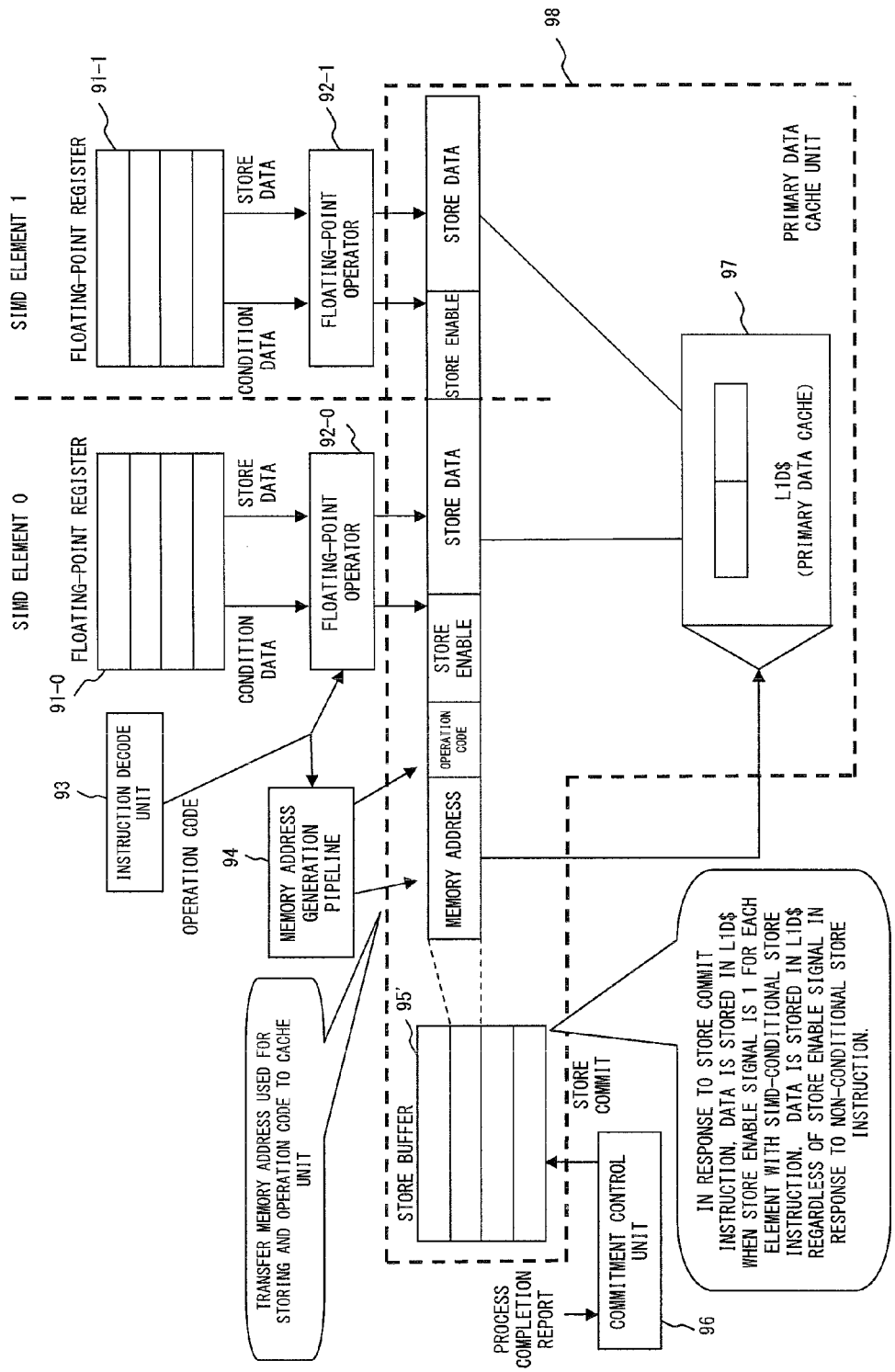
FIG. 22 shows a SIMD store process.

FIG. 22 shows a process of SIMD-conditional floating-point store instruction. In the case of a SIMD-conditional floating-point store instruction, the operation pipes corresponding to the respective elements simultaneously transfer store data and store enable signals to the primary data cache 98.

FIG. 23 shows a format of floating-point data. In the format of single-precision floating-point data, [31] represents a sign, [30:23] represents an exponent, and [22:0] represents a mantissa. In the format of double-precision floating-point data, [63] represents a sign, [62:52] represents an exponent, and [51:0] represents a mantissa. By using the most significant bit of the register for condition data, i.e., by using the sign bit in FIG. 23, when the sign (i.e. positive or negative) of floating-point data is the only condition, the register storing the data is used as the condition data, and a conditional floating-point store instruction can be executed.

The store buffer 95 of the primary data cache 98 in FIG. 19 receives necessary information such as addresses or operation codes from the address pipe, and also receives store data and a store enable signal from the pipeline of the store data. As shown in FIG. 22, in the case of a SIMD-conditional floating-point store instruction, a store buffer 95' of the primary data cache 98 receives store data and a store enable signal.

In FIGS. 19 and 22, a commitment control unit 96 receives from the primary data cache 98 a "process completion report" indicating that there is no trap for the memory address, and also receives a report indicating that the store data was transferred from the floating-point operator pipeline 92 to the primary data cache 98, and commits the instruction in accordance of the program order. When committing the instruction, the commitment control unit 96 transfers to the store buffer 95 a signal that requires writing, to a cache, store data named "store commit". The commitment control unit 96 does not discriminate between non-conditional store instructions and SIMD.

When the store buffer 95 in FIG. 19 receives the store commitment, and when the request corresponding to the commitment is a condition store instruction, the store buffer 95 refers to the store enable signal, and stores the store data in the cache when the store enable signal is "1". In the case of a non-conditional store instruction, the store data is stored in the cache regardless of the store enable signal.

The store buffer 95 in FIG. 22 refers to the store enable signals of the respective elements when the request of the port that has received the store commit is SIMD, and stores the store data of the element whose store enable signal is "1". In the case of a non-conditional store instruction, the store buffer 95 stores the store data in the cache regardless of the store enable signals.

Next, a bypass process of store data in a store instruction process will be explained.

In response to a non-conditional store instruction, addresses are compared in the store buffer when a load request subsequent to the same address as that of the store instruction is made. When these addresses are not identical to each other, data is read from the primary cache and given to the register unit. When these addresses are identical, the store data is bypassed from the store data buffer holding the store data before the data is written to the cache unit, and the loaded data is returned to the register unit.

However, whether data of a conditional store is to be written to a cache or not is determined based on the store enable bit. When the load address is identical to an address used in the conditional store instruction, the store data and the store enable signal are set in the store data buffer, and thereafter the store data is bypassed when the store enable signal is "1". On the other hand, when the store enable signal is "0", the store data is not bypassed, data is read from the cache unit, and is returned to the register unit.

FIG. 24 is a flowchart for a bypass process of store data.

First in S1, the memory address of the store buffer is compared with the subsequent load request address. When they are identical to each other, the process proceeds to S2. When the memory address and the subsequent load request address are not identical, the process proceeds to S5, and the data of the primary data cache is returned as loaded data.

In S2, it is determined whether or not the operation code of the store buffer is a conditional store instruction. When the operation code is a conditional store instruction (Yes), the process proceeds to S3. When the operation code is a non-conditional store instruction (No), the process proceeds to S4, and the data of the store buffer is bypassed as loaded data. When the process has proceeded from S2 to S3, it is determined whether or not the store enable signal of the buffer is "1", and when the store enable signal is "1" (Yes), the process proceeds to S4, wherein the data of the store buffer is bypassed as loaded data. When the store enable signal is not "1" (No), the process proceeds to S5, wherein the data of the primary data cache is returned as loaded data without bypassing the store buffer.

Whether or not data of each SIMD element is to be written to a cache is determined based on a store enable signal. Accordingly, when the subsequent load request and the address used in the SIMD-conditional store instruction are identical to each other, the store data and the store enable signal are set in the store data buffer, and thereafter the store data is bypassed when the store enable signal is "1". When when the store enable signal is "0", the store data is not bypassed. Thereafter, data is read from the cache unit, and is returned to the register unit. The process flow for the SIMD-conditional store instruction is the same as that in FIG. 24, and accordingly the explanation thereof is omitted.

In the above explanation for the example of the present invention, the definition and processing are performed on both the double-precision floating point and single-precision floating point for the above described conditional floating-point store instructions, floating-point comparison operation instructions, floating-point logic operation instructions, and respective SIMD instructions.

The above described processer has a feature wherein condition data is stored in a floating-point register itself, and the operation unit executes a conditional floating-point store instruction of determining whether or not to store the store data in accordance with the condition data. In other words, a mask register dedicated to storing condition data for conditional floating-point store instructions is not provided, and instructions are defined so that condition data is stored in a floating-point register. Thereby, condition data can be read via a read port that is used for normal floating-point operations, and dependence relationships can be detected without using a dependence-relationship-detection circuit, and thereby conditional floating store instructions can be implemented at a low cost in view of hardware. Also, condition data is stored in a floating-point register, and accordingly compilers can be further optimized because the number of pieces of condition data is not limited by the number of condition codes. Further, SIMD expansion of a floating-point register is performed so that conditional floating-point store instructions can be changed into the SIMD format.

In some programs, it is determined by the condition of fixed-point data whether or not to store fixed-point data or floating-point data, and in other programs, it is determined by the condition of floating-point data whether or not to store fixed-point data. However, many super computers which are used in the field of scientific computations handle floating-point data, and the present invention achieves a great effect in view of the circuit volume of hardware and of the optimization of compilers.

What is claimed is:

1. A processor, comprising:
   floating-point registers to store condition data and store data of a conditional floating-point store instruction; and
   an operation unit to read out the condition data and the store data of the conditional floating-point store instruction simultaneously by using a plurality of read ports of the floating-point registers and to determine whether to execute the conditional floating-point store instruction using the read-out condition data.

2. The processor according to claim 1, wherein:
the condition data is stored in most significant bits of the floating-point registers.

3. The processor according to claim 2, wherein:
the operation unit further executes a floating-point comparison operation instruction by comparing the value of two floating-point registers and storing the result of comparison in the most significant bit of the floating-point register as condition data.

4. The processor according to claim 2, wherein:
the operation unit further executes a bit logic operation instruction between a plurality of pieces of the condition data.

5. The processor according to claim 1, wherein:
the conditional floating-point store instruction is one of a true-conditional floating-point store instruction of writing data to memory when condition data is true, or a false-conditional floating-point store instruction of writing data to memory when condition data is false.

6. The processor according to claim 1, further comprising:
an address generation unit to generate immediate data by shifting, by a few bits, an immediate field of the floating-point register in order to generate an address by using the immediate data.

7. The processor according to claim 1, further comprising:
a commitment control unit to commit an instruction, wherein:
when a load instruction that is subsequent in a program is issued to a same memory address before the conditional floating-point store instruction is committed by the commitment control unit:
store data is returned to a register unit as loaded data when a store condition is satisfied; and
loaded data is returned from a cache unit to a register when a store condition is not satisfied.

8. The processor of claim 1, wherein:
the processor is to execute the instructions free of a number of condition codes in the condition data.

9. A method for executing a conditional store instruction in a processor, comprising:
storing condition data and store data of a conditional floating-point store instruction in a floating-point register; and
reading out the condition data and the store data of the conditional floating-point store instruction simultaneously by using a plurality of read ports of the floating-point register and determining whether to execute the conditional floating-point store instruction using the read-out condition data.

10. An information processing apparatus including a processor, said processer comprising:
a floating-point register to store condition data and store data of a conditional floating-point store instruction in a floating-point register; and
an operation unit to read out the condition data and the store data of the conditional floating-point store instruction simultaneously by using a plurality of read ports of the floating-point register and to determine whether to execute the conditional floating-point store instruction using the read-out condition data.

11. The information processing apparatus of claim 10, wherein:
the processor is to execute the instructions free of a number of condition codes in the condition data.

* * * * *